United States Patent
Tan et al.

(10) Patent No.: US 11,355,004 B2
(45) Date of Patent: Jun. 7, 2022

(54) SYSTEMS AND METHODS OF SECURITY SYSTEM ACCESS AND SHARING TEMPORAL EVENT-BASED NOTIFICATIONS AND ACCESS TO DEVICES OF DESIGNATED PERSONS

(71) Applicant: Google LLC, Mountain View, CA (US)

(72) Inventors: Leon Tan, Burlingame, CA (US); J. Brad Foreman, San Francisco, CA (US); John Jordan Nold, Erie, CO (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/109,026

(22) Filed: Dec. 1, 2020

(65) Prior Publication Data
US 2021/0217295 A1    Jul. 15, 2021

Related U.S. Application Data

(60) Provisional application No. 62/961,088, filed on Jan. 14, 2020.

(51) Int. Cl.
| | |
|---|---|
| *G08B 27/00* | (2006.01) |
| *G08B 13/189* | (2006.01) |
| *G07C 9/00* | (2020.01) |
| *G08B 25/00* | (2006.01) |
| *G08B 25/10* | (2006.01) |
| *G05B 15/02* | (2006.01) |

(52) U.S. Cl.
CPC ........... *G08B 27/003* (2013.01); *G05B 15/02* (2013.01); *G07C 9/00309* (2013.01); *G08B 13/189* (2013.01); *G08B 25/008* (2013.01); *G08B 25/10* (2013.01); *G08B 27/006* (2013.01); *G05B 2219/2642* (2013.01); *G07C 2009/00317* (2013.01)

(58) Field of Classification Search
CPC . G08B 25/008; G08B 27/003; H04L 63/0838; G07C 9/00563; H04N 7/186; H04N 7/188
See application file for complete search history.

(56) References Cited

U.S. PATENT DOCUMENTS

| | | |
|---|---|---|
| 9,600,645 B2 | 3/2017 | Fadell |
| 9,633,548 B2 | 4/2017 | Sager |
| 9,666,000 B1 * | 5/2017 | Schoenfelder ......... G07C 9/257 |
| | (Continued) | |

*Primary Examiner* — Mirza F Alam
(74) *Attorney, Agent, or Firm* — Kevin Roddy; Butzel Long

(57) ABSTRACT

Implementations of the disclosed subject matter provide systems and methods of granting temporary control access of a home security system of a first user to a second user, where the temporary control access is for at least a portion of a home security system for a predetermined period of time. One or more tasks to be completed for the first user may be completed by the second user while having temporary control access to the home security system. The temporary control access of the second user to the at least a portion of the home security system of the first user may be revoked when the predetermined period of time has elapsed. The second user may receive a notification may be received for a security event, a safety event, a home event, and a package delivery event after the predetermined period of time has lapsed.

18 Claims, 12 Drawing Sheets

(56) References Cited

U.S. PATENT DOCUMENTS

| | | | | |
|---|---|---|---|---|
| 10,121,301 | B1* | 11/2018 | Ren | G07C 9/00571 |
| 2014/0149244 | A1* | 5/2014 | Abhyanker | G06Q 10/10 |
| | | | | 705/26.2 |
| 2018/0075681 | A1* | 3/2018 | Scalisi | G06K 9/00771 |
| 2018/0176213 | A1* | 6/2018 | Hwang | H04L 67/02 |

* cited by examiner

Notification: Your neighbor at 121 Main Street is on vacation, and has just received a package. Click here for access pin.

SYSTEMS AND METHODS OF SECURITY SYSTEM ACCESS AND SHARING TEMPORAL EVENT-BASED NOTIFICATIONS AND ACCESS TO DEVICES OF DESIGNATED PERSONS

CROSS-REFERENCE TO RELATED APPLICATIONS

This application claims priority to U.S. Application Ser. No. 62/961,088, filed Jan. 14, 2020, the disclosure of which is incorporated by reference in its entirety.

BACKGROUND

Presently, home security systems determine whether a break-in attempt has occurred at a home, and output an audible or visual alarm. Homes with security systems typically include motion sensors, and can include open-close sensors for doors and windows, door locks, doorbell cameras, and cameras to determine whether there is a break-in attempt or other security event. Homes also typically include separate smoke detectors and carbon monoxide sensors to determine whether there is a fire or a predetermined level of carbon monoxide, respectively. If desired, a homeowner or resident of a neighborhood may engage with a separate social networking service to allow neighbors to communicate regarding neighborhood events. Such social networking services are unrelated and unconnected to the home security system, the smoke detectors, and the carbon monoxide detectors.

BRIEF SUMMARY

According to an implementation of the disclosed subject matter, a method may include receiving, at a computing device, a grant of temporary control access of a home security system of a first user to a second user having the computing device, where the temporary control access is for at least a portion of a home security system for a predetermined period of time. A temporary structure may be added at the computing device of the second user to access and control the at least a portion of the home security system of the first user based on the grant of the temporary control access. A task list may be received at the computing device of the second user that includes one or more tasks to be completed for the first user while the second user has temporary control access of at least the portion of the home security system. A revocation of the temporary control access of the second user to the at least a portion of the home security system of the first user may be received at the computing device of the second user when the predetermined period of time has elapsed. A notification of a security event, a safety event, a home event, and/or a package delivery event that is determined by the home security system of the first user after the predetermined period of time has lapsed may be received by the computing device of the second user.

According to an implementation of the disclosed subject matter, a system may include a home security system communicatively coupled to a communications network and a computing device having a processor and a memory that is communicatively coupled to the communications network. The computing device may receive a grant of temporary control access of a home security system of a first user to a second user having the computing device, where the temporary control access is for at least a portion of the home security system for a predetermined period of time. The computing device of the second user may add a temporary structure to access and control the at least a portion of the home security system of the first user based on the grant of the temporary control access. The computing device of the second user may receive a task list that includes one or more tasks to be completed for the first user while the second user has temporary control access of at least the portion of the home security system. The computing device of the second user may receive a revocation of the temporary control access of the second user to the at least a portion of the home security system of the first user when the predetermined period of time has elapsed. The computing device of the second user may receive a notification of a security event, a safety event, a home event, and/or a package delivery event that is determined by the home security system of the first user after the predetermined period of time has lapsed.

According to an implementation of the disclosed subject matter, means for managing a home security system and granting access may include means for receiving a grant of temporary control access of a home security system of a first user to a second user having the computing device, where the temporary control access is for at least a portion of a home security system for a predetermined period of time. The implementation may include means for adding a temporary structure may be added at the computing device of the second user to access and control the at least a portion of the home security system of the first user based on the grant of the temporary control access. The implementation may include means for receiving a task list that includes one or more tasks to be completed for the first user while the second user has temporary control access of at least the portion of the home security system. The implementation may include means for revocation of the temporary control access of the second user to the at least a portion of the home security system of the first user may be received at the computing device of the second user when the predetermined period of time has elapsed. The implementation may include means for receiving a notification of a security event, a safety event, a home event, and/or a package delivery event that is determined by the home security system of the first user after the predetermined period of time has lapsed may be received by the computing device of the second user.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIGS. 3A-3C show example displays with notifications according to implementation of the disclosed subject matter.

DETAILED DESCRIPTION

Implementations of the disclosed subject matter may allow a first user of a home security system to grant access to a home and/or a home security system to a second user (e.g., that may be a trusted neighbor, friend, family member, or the like of the first user) for a predetermined period of time, such as when the first user is on vacation. A temporary facility to access and control at least a portion of the home security system of the first user may be added to the computing device of the second user. The first user may determine the limitations of access for the second user of the home and/or the home security system. The first user may provide a task list of activities for the second user to perform (e.g., while house-sitting when the first user is on vacation). Notifications and/or alerts regarding security events (e.g., a detected break-in attempt), safety events (e.g., a detected smoke alarm event), a home event (e.g., a visitor has arrived at the house, or the like), a package delivery event, and/or neighborhood events (e.g., discount service opportunities, safety issues, entertainment events, or the like) that may be sent to the first user and/or the second user. The notifications may continue to be provided to the second user after the temporary control access has ended.

Implementations of the disclosed subject matter may provide communications between a plurality of neighbors as part of a neighborhood network. The communication may relate to neighborhood events, activities, discount service opportunities, sales, and the like. In some implementations, the communication may be directly neighbor-to-neighbor via the neighborhood network.

Implementations of the disclosed subject matter improve over current systems, which merely provide social networking for a neighborhood, application ("app") based neighborhood watch for a predetermined radius around a home, and traditional home security systems by allowing the first user to control the access by the second user to a home and/or the home security system, and to revoke access after a predetermined period of time. Implementations of the disclosed subject matter also improve on current systems by providing notifications and/or alerts after the period of temporary access has ended. Implementations of the disclosed subject matter further improve over current systems by providing task-based access to a home for one or more selected users.

Figure 1:
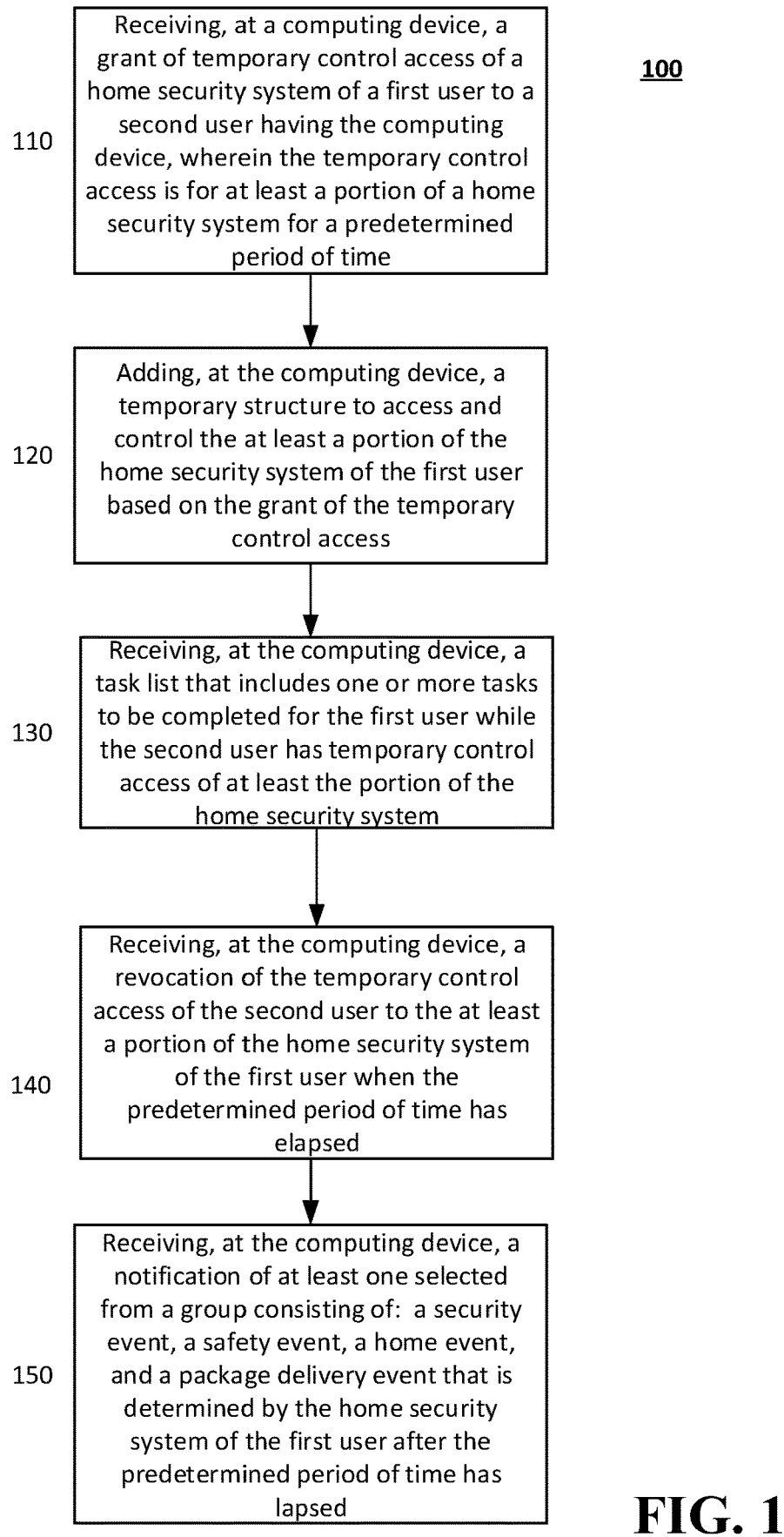
FIG. 1 shows an example method of granting access to a home security system, providing a task list, and receiving notifications according to an implementation of the disclosed subject matter.

FIG. 1 shows an example method 100 of granting access to a home security system, providing a task list, and receiving notifications according to an implementation of the disclosed subject matter. At operation 110, a grant of temporary control access of a home security system of a first user may be received by a computing device of a second user, where the temporary control access is for at least a portion of a home security system for a predetermined period of time. For example, a first user (e.g., using computing device 20a shown in FIGS. 7 and 9) may grant temporary control access to a second user (e.g., using computing device 20b shown in FIGS. 7 and 9) to at least a portion of a home security system (e.g., controller 73 shown in FIG. 7) of the first user for a predetermined period of time. The first user may receive a request for the grant of temporary control access to the home security system from the second user, or may grant temporary control access to the second user without receiving a request from the second user.

The second user may be a trusted neighbor, friend, family member or the like of the first user. The second user may not live in the same home (e.g., that is controlled by the home security system) as the first user. The first user may grant the second user the temporary control access to at least the portion of the home security system so that the second user may take care of the first user's home, and/or complete other tasks (e.g., watering plants, caring for pets, handling packages, or the like) while the first user is away from the home and/or otherwise unavailable.

The predetermined period of time granted for temporary control access to the home security system may be, for example, one or more hours, one or more days, one or more weeks, one or more months, or the like. For example, the first user may grant the second user temporary access control to the home security system of the first user for one week, which may be the duration that the first user is on vacation is away from the home, and/or is otherwise unavailable. In some implementations, more than one user may be granted temporary control access to the home security system. For example, a second user, a third user, and a fourth user may be granted temporary access control.

In some implementations, one or more of the users that have been granted access control to the home security system may have different levels of access. For example, different users may be granted access at different times of the day, and/or may have different levels of access to cameras (e.g., camera 75 shown in FIG. 7), sensors (e.g., sensor 60 shown in FIG. 6 and/or sensors 71, 72 shown in FIG. 7), or the like of the home security system. In some implementations, the first user may select one or more portions of the security system and/or devices that the second user may have access to during the period of temporary access control to the home security system.

In some implementations, temporary access control may be granted to the second user by providing a passcode, and/or by using face recognition authentication by the home security system. When face recognition is selected to provide temporary access control, the home security system may be updated and/or provided with facial recognition information of the second user to provide access. In some implementations, the facial recognition information may be removed and/or deleted when the temporary access is revoked.

Figure 7:
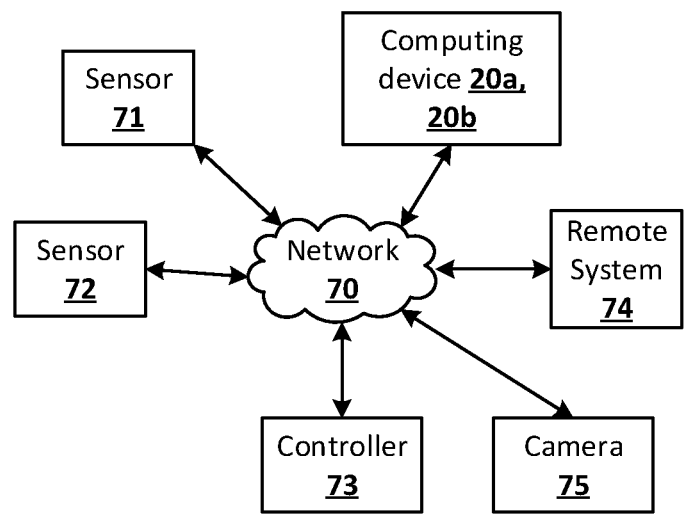
FIG. 7 shows a home environment according to an implementation of the disclosed subject matter.
Figure 9:
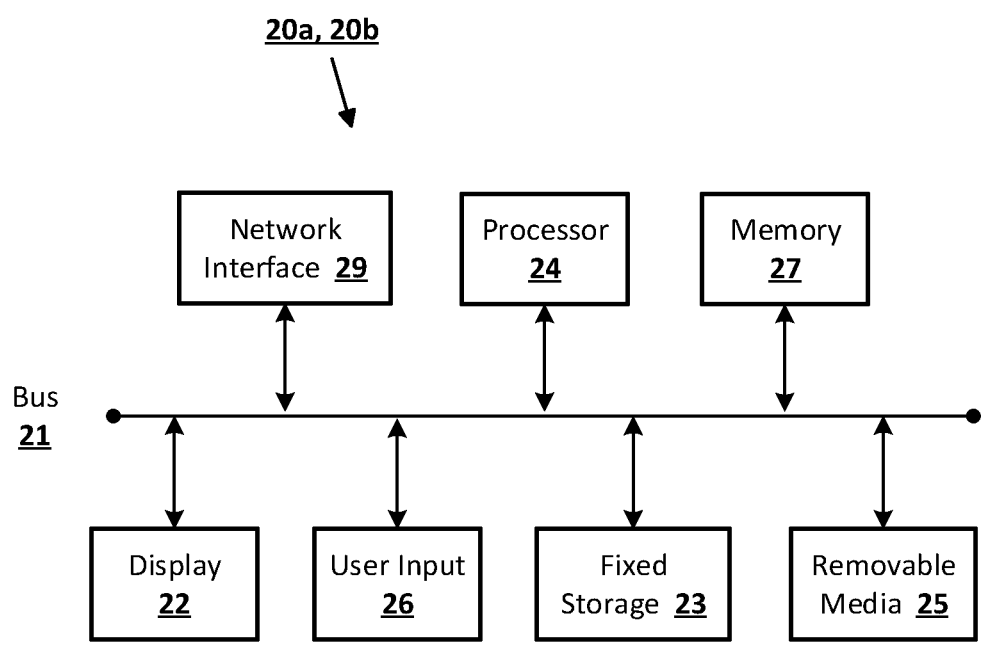
FIG. 9 shows an example computing device suitable for implementing embodiments of the presently disclosed subject matter.

At operation 120, a temporary structure to access and control the at least a portion of the home security system of the first user based on the grant of temporary control access may be added at the computing device of the second user (e.g., device 20b shown in FIGS. 7 and 9).

Figure 2:
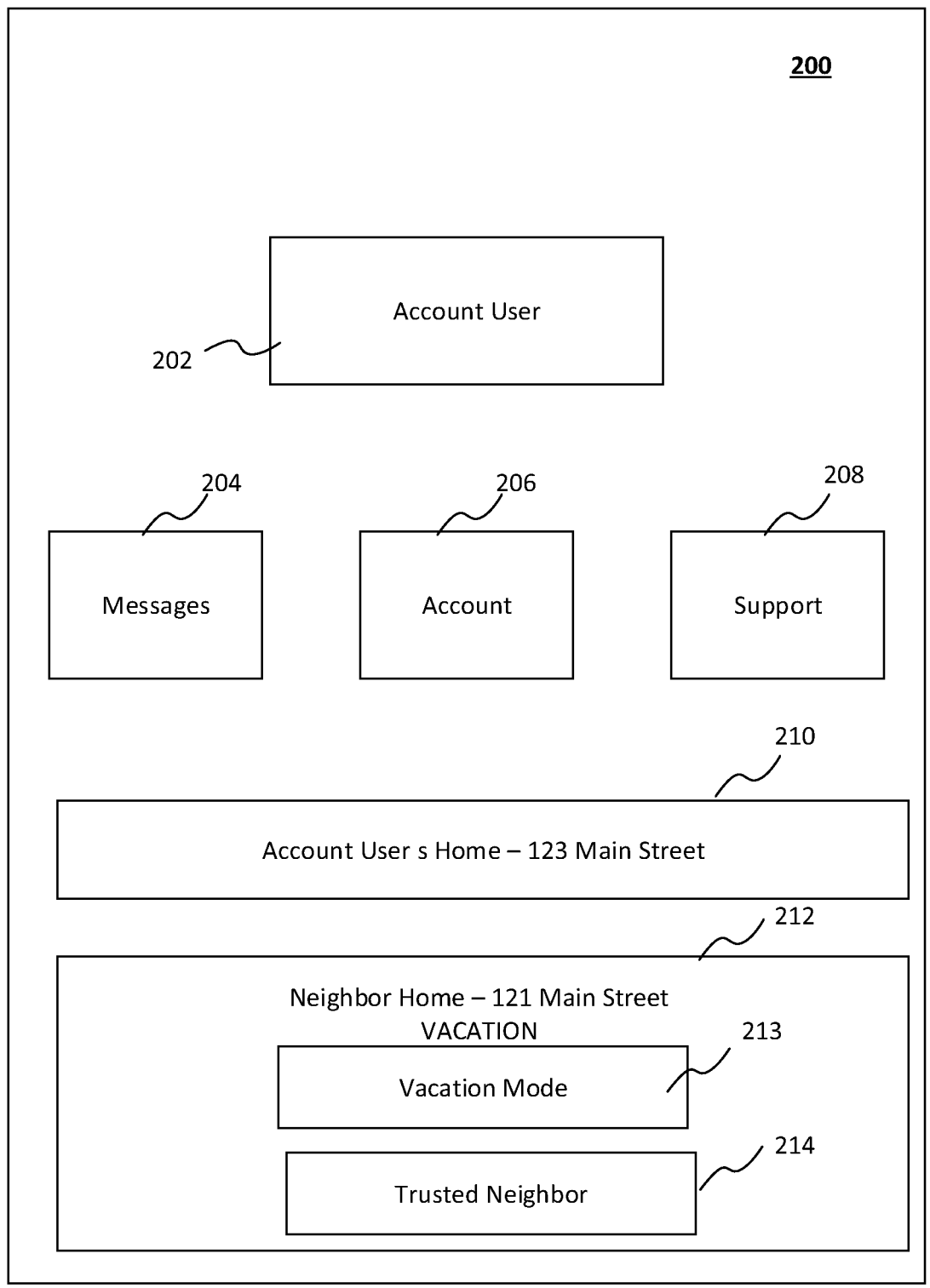
FIG. 2 shows an example display of a computing device of a second user that has been granted temporary access to manage a home security system of a first user according to an implementation of the disclosed subject matter.

For example, FIG. 2 shows a display 200 that is displayed at the computing device (e.g., computing device 20b shown in FIGS. 7 and 9) of the second user that may be used to manage a home security system of the first user based on the granting of temporary control access. The display 200 may be displayed on display 22 of device 20b shown in FIG. 9. Display item 212 shows the temporary control access to the security system of a neighbor's home at 121 Main Street. In this example, the neighbor (i.e., the first user having a home at 121 Main Street) may have granted access to the second user (i.e., who has a home security system for the home at 123 Main Street) as shown in display item 212.

In some implementations, display item 212 may automatically populate and/or depopulate (i.e., display the item 212 or remove item 212 from the display 200) when the first user grants the second user the temporary control access to the security system (i.e., the trusted neighbor status). Display item 213 may show the operating state of the home security system of the first user (e.g., vacation mode, away mode, or the like). Display item 214 may indicate whether the second user is a trusted neighbor of the first user. That is, if display item 214 is present the second user may be a trusted neighbor of the first user.

Display item 212 may be selected by the second user to perform one or more operations with the home security system of the first user, such as checking the operational status of an alarm, checking the video from the security cameras and/or sensors, or the like. That is, the computing device of the second user may be used to determine an operational status of an alarm of the home security system, an operational status of one or more sensors (e.g., sensor 60 shown in FIG. 6 and/or sensors 71, 72 shown in FIG. 7) of the home security system, and/or output from at least one sensor of the home security system when the second user has temporary control access. The output from the at least one sensor may include images, video, audio, whether smoke is detected, whether carbon monoxide is detected, and the like.

Account user 202 in display 200 may show the account user for the security system, such as the second user. The display item 210 (i.e., the home of the account user) may correspond to the user identified in the account user 202.

Figure 3A:
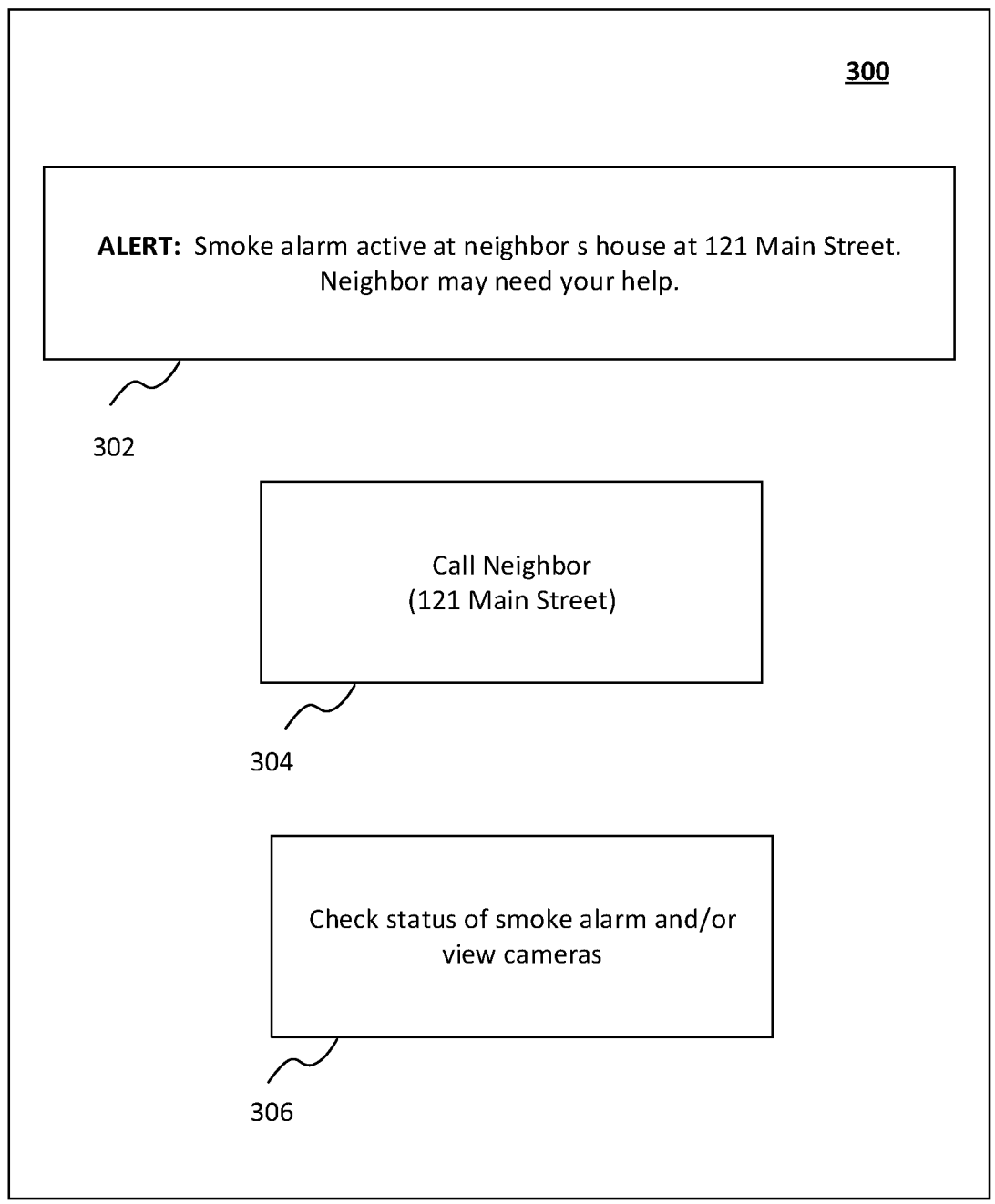

Notifications may be received by the device of the second user for a security event, a safety event, a home event, and/or a package delivery event. The home security system of the first user may determine one or more of these events, and may provide them to the device of the second user, for example, when the second user has temporary control access. Messages 204 may be selected to view messages and/or notifications regarding a user's security system and/or other neighborhood events, such as alert 302 shown in FIG. 3A, alert 312 shown in FIG. 3B, and/or notification 322 shown in FIG. 3C. Display 300 shown in FIG. 3A may include alert 302, which alerts the second user that the security system of the first user (e.g., residing at 121 Main Street) has a smoke alarm that may be activated, and the first user may need assistance. Display item 304 may be selected to call the first user regarding the alert 302 (e.g., at a primary phone number stored in the computing device of the second user). Display item 306 may be selected to determine the status of the smoke alarm of the first user using the computing device of the second user. In some implementations, the computing device of the second user may view one or more images captured by one or more cameras communicatively coupled to the home security system to determine the source of the smoke, and/or whether the first user needs assistance.

In some implementations, the display 300 may include one or more options to receive an image or data from one or more sensors of the home security system, and an option to contact the first user when there is a safety event, a security event, a home event, or a package delivery event when the second user has temporary control access.

In some implementations, display 300 may be displayed on the computing device of the second user and/or a smart display (e.g., smart watch, wearable computing device, smart television, tablet, or the like) of the second user. In some implementations, the alert 302 may be an audio alert output from a smart speaker of the second user and/or other audio output device of the second user.

In some implementations, the second user may contact the first user via a network messaging system (e.g., voice and/or text via network 70 shown in FIG. 8) to determine whether the first user needs assistance before, for example, contacting the fire department and/or emergency services. When the first user does need assistance, a code and/or pin may be provided to the second user for entry into the first user's home.

In some implementations, if a plurality of unsuccessful passcode attempts are made within a predetermined period of time (e.g., 30 seconds, 1 minute, 2 minutes, or the like), the home security system may transmit an alert to the first user, the second user, the neighborhood network, and/or a security provider regarding the entry attempt.

In another example, a sensor (e.g., sensor 60 shown in FIG. 6 and/or sensor 71, 72 shown in FIG. 7) of the home security system may detect the sound of breaking glass. An alert may be transmitted from the home security system to the first user (i.e., computing device 20a shown in FIGS. 7 and 9) and/or the second user (i.e., computing device 20b as shown in FIGS. 7 and 9) based on the detected sound.

Figure 3B:
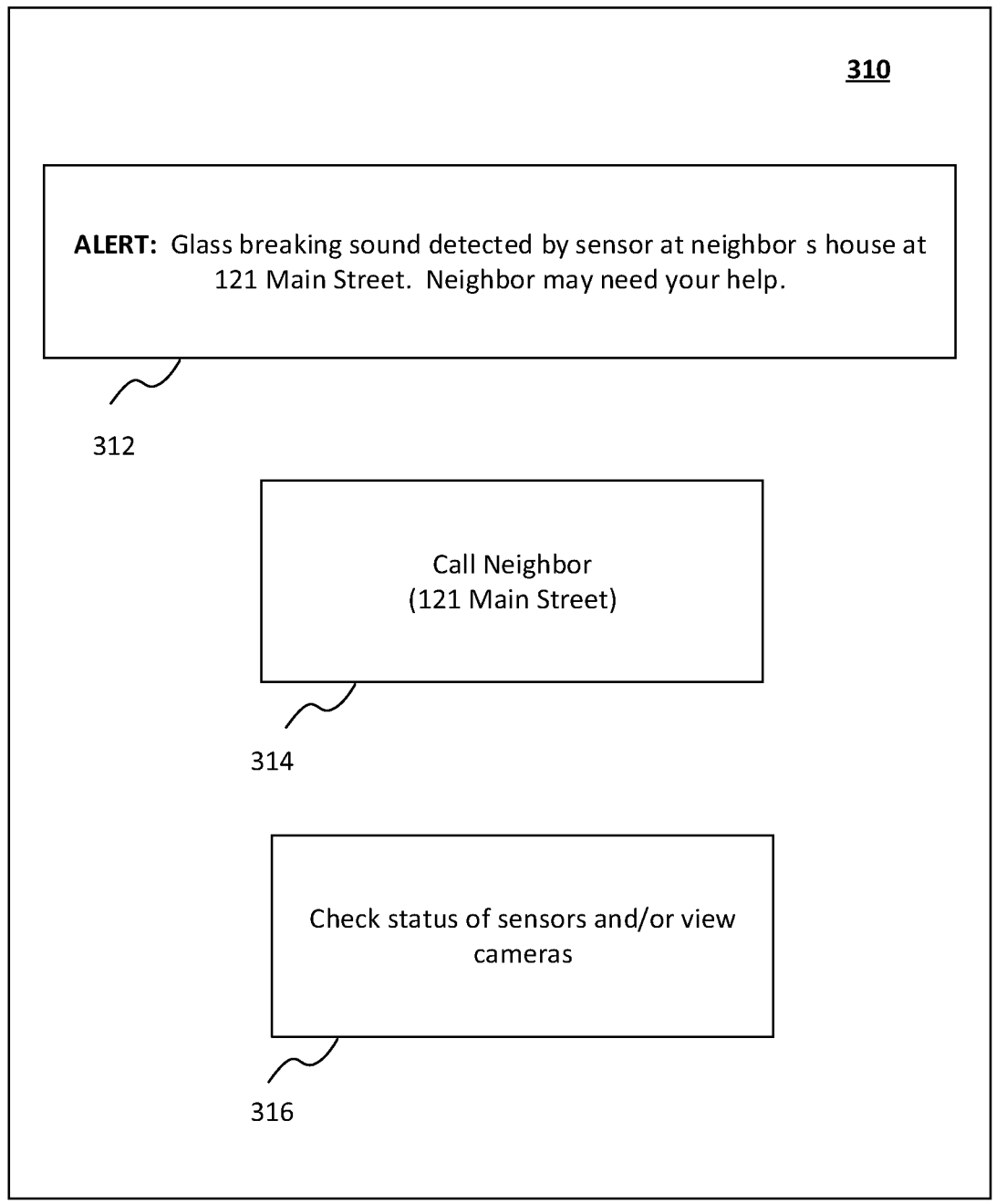

For example, as shown in FIG. 3B, display 310 may include alert 310, which alerts the second user that the security system of the first user (e.g., residing at 121 Main Street) has a detected the sound of glass breaking, and the first user may need assistance. Display item 314 may be selected to call the first user regarding the alert 312 (e.g., at a primary phone number stored in the second computing device). Display item 316 may be selected to check the status of one or more sensors of the security system to verify that they are operating normally, and/or to determine whether other sensors have collected data which verify the break-in attempt. In some implementations, the second user device may view one or more images captured by one or more cameras communicatively coupled to the home security system to verify the break-in attempt, determine the location of the break-in attempt, and/or determine whether the first user needs assistance.

In some implementations, display 310 may be displayed on the second computing device and/or a smart display (e.g., smart watch, wearable computing device, smart television, tablet, or the like). In some implementations, the alert 302 may be an audio alert output from a smart speaker of the second user and/or other audio output device of the second user.

In another example, display 320 shown in FIG. 3C may include notification 322, which notifies the second user that the first user has received a package. The second user may receive this notification, for example, when the first user is on vacation or is away from the house. In this example, the first user may grant the second user access rights to the second user, so that the second user may retrieve the package (e.g., from a container) and/or place it in the home of the first user. The notification 322 may be selected to receive a code to retrieve a package from a container (i.e., which may accept the code to be opened) and/or the code may open a door to the first user's home and/or garage where the package may be placed. In some implementations, the first user may receive a notification that the second user has retrieved the package. In some implementations, display 320 may be displayed on the computing device and/or a smart display (e.g., smart watch, wearable computing device, smart television, tablet, or the like) of the second user. In some implementations, the notification 322 may be an audio alert output from a smart speaker of the second user and/or other audio output device of the second user.

In some implementations, the alert 302, alert 312, and/or the notification 322 may include an audible alert and/or notification. Such notifications may be output, for example via a smart speaker and/or other audio output device of the second user. In some implementations, the alert 302, the alert 312, and/or the notification 322 may be received from local emergency service providers (e.g., police department, fire department, ambulance service, weather service, security service provider, or the like). Notifications and/or alerts provided from a neighborhood network may be displayed as alert 302, alert 312, and/or notification 322.

In another example, a local school may declare a snow day and/or early school dismissal (e.g., because of unfavorable weather), and a notification may be transmitted to the second user (e.g., from controller 73 or remote system 74 via network 70 to device 20b shown in FIG. 7) that the first user has entrusted to help with childcare. In some implementations, the second user may share security camera (e.g., camera 75 shown in FIG. 7) access with the first user so that the first user may view their child in the home of the second user.

In another example, when the first user is an elderly user and/or may benefit from additional care and/or assistance from others, the first user may grant the second user with persistent guest access for entry and/or event notifications.

Account 206 shown in FIG. 2 may be selected to provide account information for the account user, such as security system settings, contact information for one or more persons to receive security system notifications, and the like. Support 208 may be selected to contact a service representative regarding the operation of a user's home security system.

In some implementations, when the first user sets the home security system to be in "Away" or "Vacation" mode, privileges and/or access may be granted to the second user (e.g., to enter the home of the first user, receiving temporary control access to the home security system, and the like). When the home security system is in the Away or Vacation modes, the home security system may be armed. For example, sensors on the doors and/or windows may be used to determine whether there is a tampering or break-in attempt. In some implementations, one or more cameras may capture images and/or video when the home security system is in the Away or Vacation mode. The Away and Vacation modes may differ, for example, by the length of time that the first user is away. For example, the Away mode may be used if the first user is away for a few hours or a day, and the Vacation mode may be used for periods of time longer than a day. In some implementations, the Vacation mode may also control the HVAC (heating, ventilation, and air conditioning) system, so as to conserve the use of energy in heating or cooling the home of the first user.

Figure 4A:
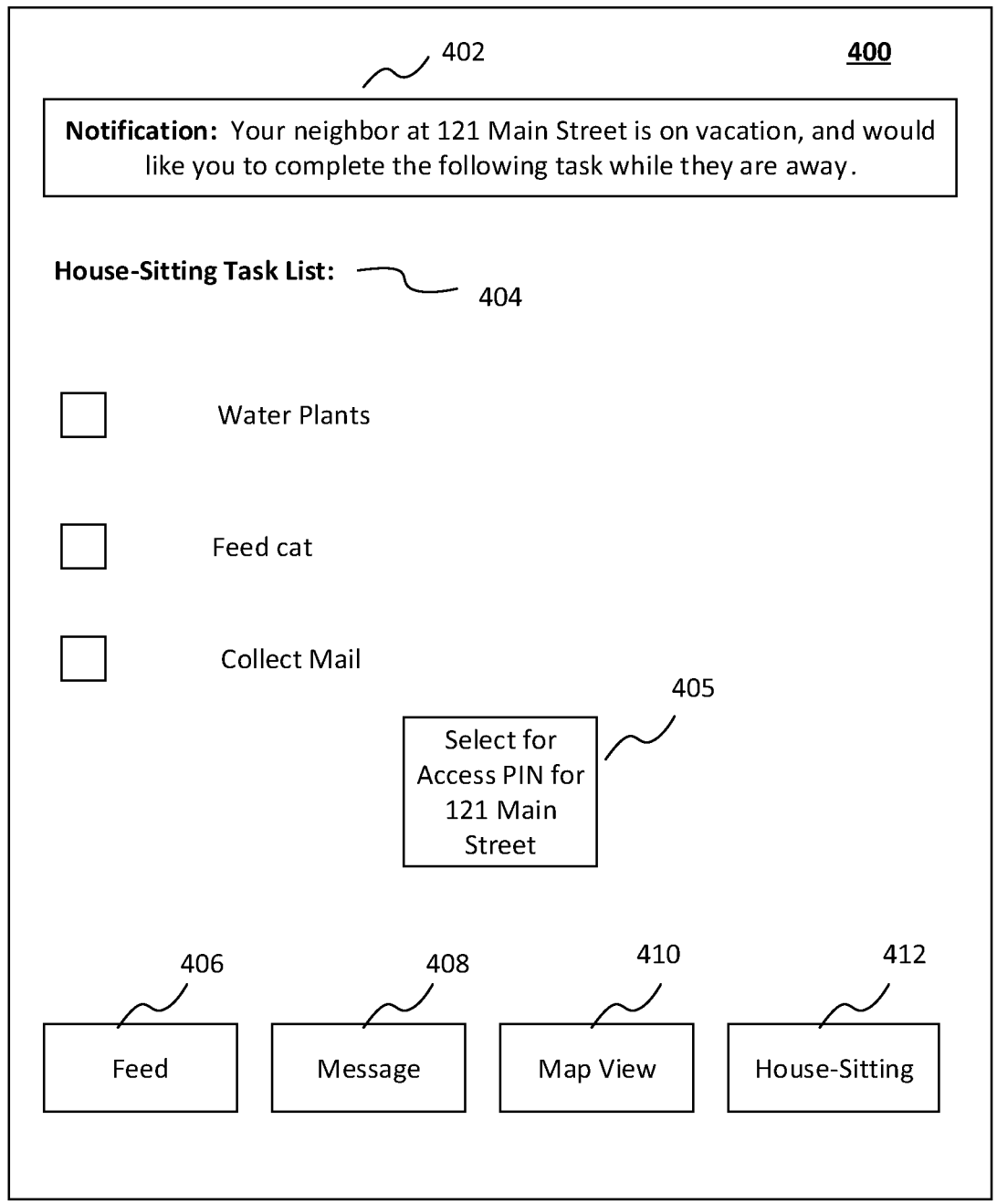
FIG. 4A shows an example display including a task list according to an implementation of the disclosed subject matter.

At operation 130 of FIG. 1, a task list may be received by the computing device (e.g., device 20b shown in FIG. 7) of the second user that includes one or more tasks to be completed while the second user has temporary control access of at least the portion of the home security system of the first user. FIG. 4A shows a display 400 which may include a notification 402, which indicates that the first user is away (e.g., on vacation, away for one or more days, or the like), and has provided a task list 404, which may have tasks for the second user to complete for the first user which the first user is away (and has granted access to first user's home). For example, as shown in FIG. 4A, the task list may include watering plants, feeding the cat, collecting mail, and the like. In some implementations, when the first user sets the home security system to Vacation mode, the task list may be transmitted to the second computing device. Display 400 may include item 405, which, when selected may provide an access PIN for the first user's house (e.g., a PIN for a keypad for a door, or the like) so that the second user may enter the house to complete the tasks of the task list 404, such as feeding the cat, watering the plants, bringing the mail and/or packages from the mailbox to inside the house, or the like. The access PIN may work for the period that the first user is on vacation. After the vacation period has ended, the PIN may no longer provide access to the first user's house.

Figure 8:
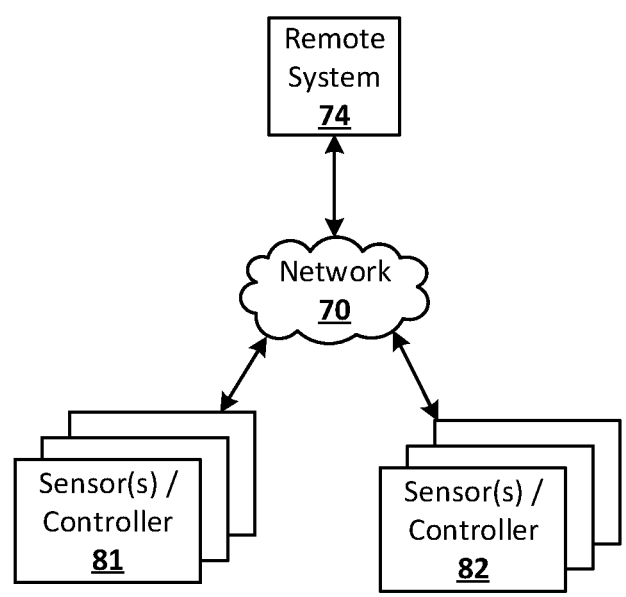
FIG. 8 shows a remote system to aggregate data from multiple locations having security systems according to an implementation of the disclosed subject matter.

In some implementations, the computing device may receive from one or more other devices of a neighborhood network group a notification of an event, a notification of a neighborhood activity, a notification of discount opportunity, a notification of a neighborhood sale, a message from a neighbor, a notification of a query from the neighborhood network group, a neighborhood image, neighborhood video, and/or neighborhood audio. For example, feed 406 may be selected to provide a display of neighborhood notifications and/or information (e.g., upcoming events and the like). Selecting message 408 may allow a user to send a message to another user (e.g., who has been granted access to the home security system and/or may be part of a neighborhood network), and/or to one or more designated neighbors (e.g., from controller 81 to controller 82 via network 70 as shown in FIG. 8). In some implementations, the message 408 may provide direct messaging between users of the neighborhood network.

The display of the computing device may display a map showing a location of the neighborhood activity, a location of the neighbor to share the neighborhood image, a location of the neighbor to share the neighborhood video, and/or a location of the neighbor to share the neighborhood audio. For example, map view 410 may be selected to identify locations where a first user and/or second user's home is located, the location related to any alerts and/or notifications received, or the like. In some implementations, map view 410 may provide the location of other sharable camera and/or sensors of home security systems of houses that may be part of a neighborhood network (e.g., remote system 74, controller 81, and/or controller 82 shown in FIG. 8). For example, when map view 410 is selected in display 400 shown in FIG. 4A, display 430 shown in FIG. 4C may be displayed on the computing device of the second user. The users of the neighborhood network may provide live snapshots and/or video from a camera (e.g., camera 75 shown in FIG. 7), and/or previously stored images and/or video captured with the camera to one or more users of the network. For example, items 432, 434, 436, 438, and/or 440 may indicate users of the neighborhood network that have images, video, or the like to share. Selection of one or more of the items 432, 434, 436, 438, and/or 440 may display a window with an image and/or a player to play a video and/or audio. The shared image images, video, and/or audio may include examples of noisiness of automobile traffic at a location, visual image of traffic at a location, sound and/or images of a break-in attempt, image of a pet reported missing, or the like.

House-sitting 412 may be selected to provide information regarding house-sitting for the second user, such as what areas of the house the second user has access to, which cameras and/or sensors the second user has access to, and the like. In some implementations, house-sitting 412 may allow a user to provide instructions regarding house-sitting activities for another user.

Figure 4B:
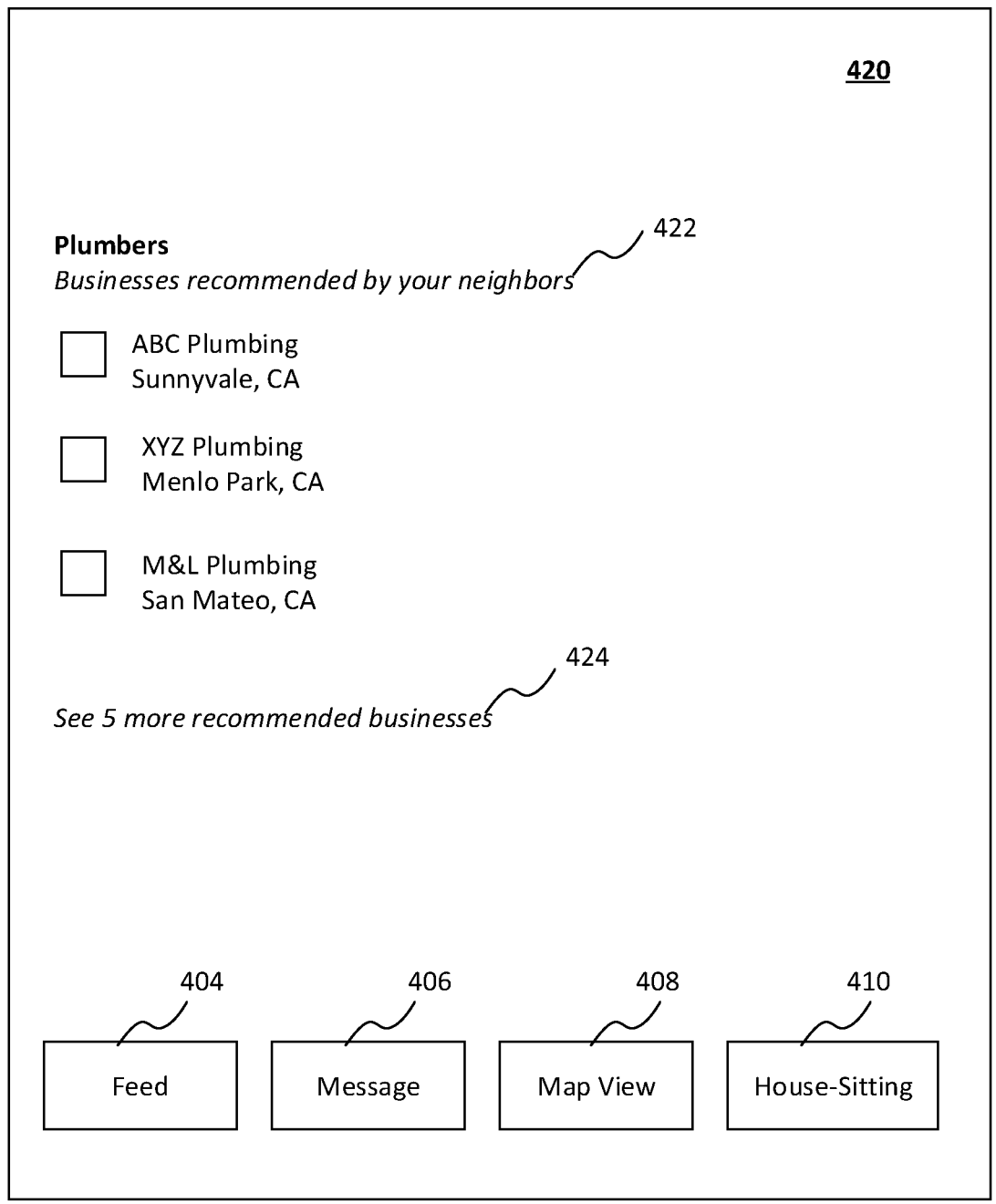
FIG. 4B shows an example display including services recommended by neighbors according to an implementation of the disclosed subject matter.
Figure 4C:
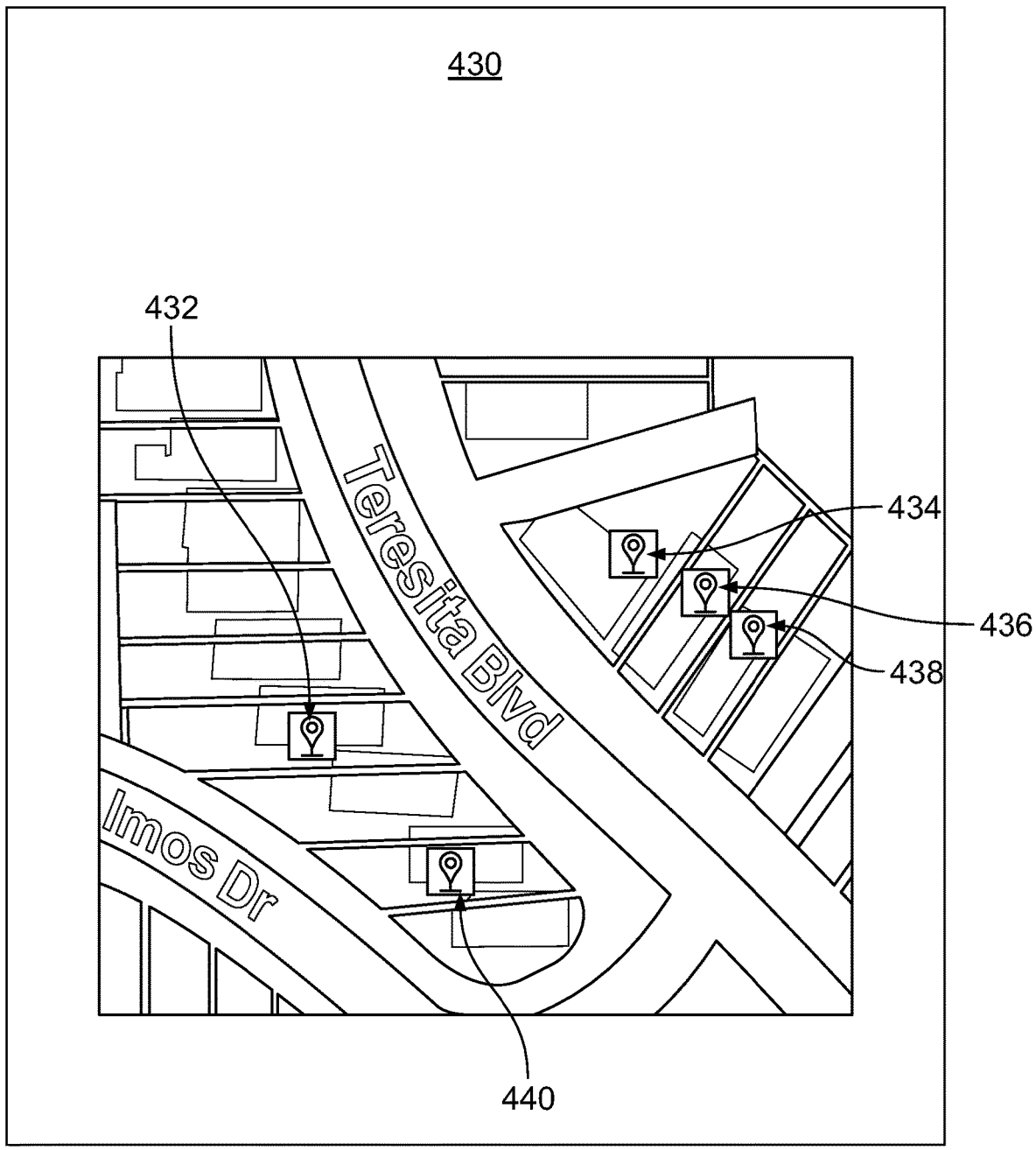
FIG. 4C shows an example display including a map that indicates neighbors that have images, video, and/or audio to share.
Figure 5:
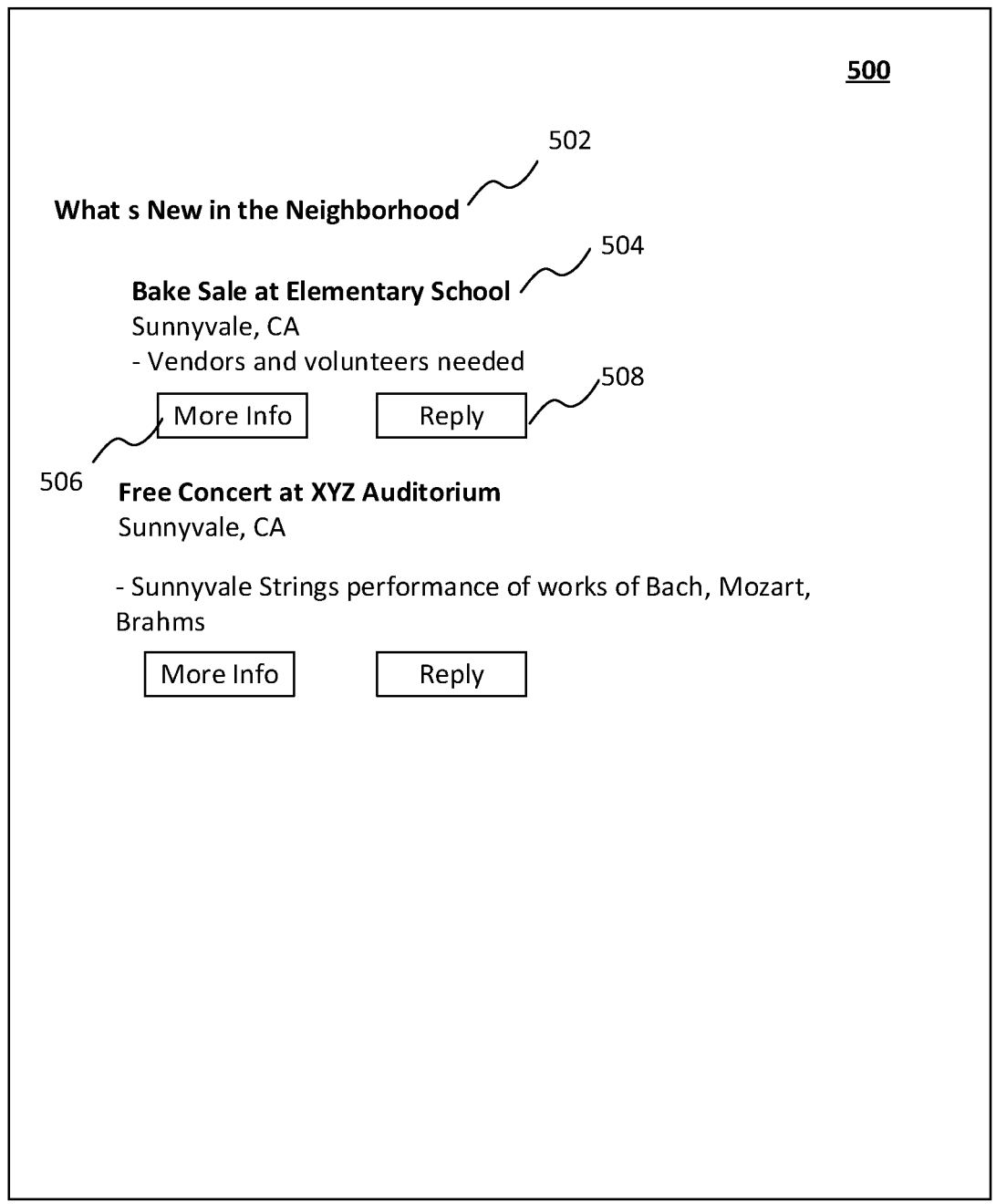
FIG. 5 shows an example display of upcoming neighborhood events according to an implementation of the disclosed subject matter.

In some implementations, the computing device may transmit a query to one or more other devices of a neighborhood network group, and may receive recommendations from the one or more other devices based on the query, and responses from the one or more other devices based on the query. The display of the computing device may provide recommendations and/or information for a user based on a query. For example, FIG. 4B shows display 420, which may include recommendations for plumber 422 based on a query for a plumber recommendation, where the service providers may be selected for display based on input from one or more neighbors (e.g., from controller 81, 82 and/or remote system 74 via network 70 as shown in FIG. 8). A user may select more recommendations 424 to view additional plumber recommendations.

In some implementations, the display 420 may provide information based on a query, where the information may be gathered based on available information from a neighborhood network. For example, the display 420 may provide information to a query for available open houses for real estate sales in a neighborhood, whether any neighbors are selling tickets to an upcoming sporting event, whether any neighbors have seen a lost pet (e.g., a lost dog or the like), whether a neighbor has a tool a user may borrow, or the like.

In some implementations, the display 420 may provide information regarding neighborhood group discounted services via the neighborhood network (e.g., network 70 shown in FIG. 8, where the information is transmitted from remote system 74 to the controller 81, 82 and/or device 20*a*, 20*b*). For example, display 420 may provide an HVAC (heating, ventilation, and air conditioning) service provider that may provide a discounted rate for the neighborhood for spring and fall HVAC service check-ups.

When the predetermined period of time has elapsed, the temporary control access of the second user to the at least a portion of the home security system of the first user may be revoked at operation 140. For example, the device 20*a*, controller 73, and/or remote system 74 may revoke the temporary access control of device 20*b* to controller 73.

A notification of at least one of a security event, a safety event, a neighborhood event, a home event, and/or a package delivery event that is determined by the home security system of the first user may be transmitted to the computing device of the second user after the predetermined period of time has lapsed at operation 150. That is, after the revoking of the temporary control access to the home security system, the second user (i.e., the trusted neighbor, friend, and/or family member) may continue to receive alerts and/or notifications on device 20*b*, such as alert 302 shown in FIG. 3A and described above, and/or notification 312 shown in FIG. 3B and described above.

In some implementations, a notification may be transmitted to the computing device of the second user, after the second user has been invited to be a trusted neighbor of the first user, depending on the type of notification (e.g., a security event notification, a safety event notification, a neighborhood event notification, a home event notification, or the like).

The systems and methods described above in connection with FIGS. 1-5 may be part of a home environment having sensors, as shown and described in connection with FIGS. 6-9. The home environment, which may include the home security system discussed above with FIGS. 1-5, may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, and the like. A sensor can include, for example, a camera, a retinal camera, and/or a microphone.

A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a home environment as disclosed herein. For example, a sensor may operate as a security sensor when it is used to determine security events such as unauthorized entry. A sensor may operate with different functions at different times, such as where a motion sensor is used to control lighting in a home environment when an authorized user is present, and is used to alert to unauthorized or unexpected movement when no authorized user is present, or when an alarm system is operating in an away mode, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 6:
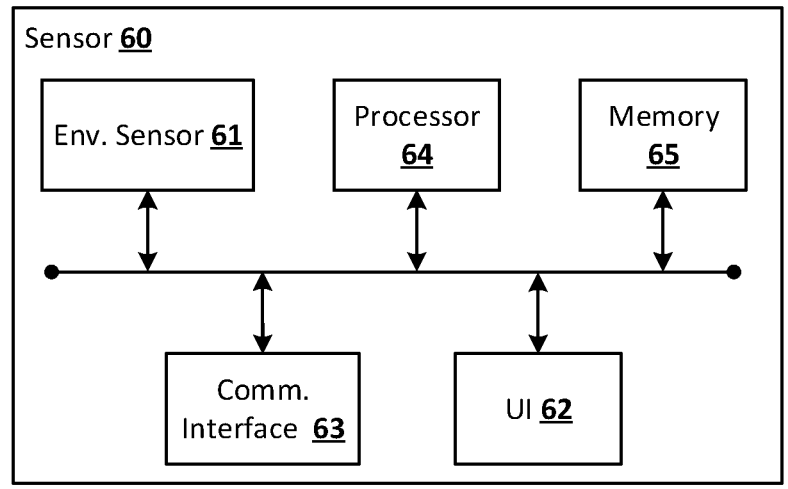
FIG. 6 shows an example sensor according to an implementation of the disclosed subject matter.

A sensor may include hardware in addition to the specific physical sensor that obtains information about the environment. FIG. 6 shows an example sensor of the home environment as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, image sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices.

A user interface (UI) 62 may provide information (e.g., via a display device or the like) and/or receive input from a user of the sensor. The UI 62 may include, for example, a speaker to output an audible alarm and/or message when an event is detected by the sensor 60, such as an opening of a door or window. Alternatively, or in addition, the UI 62 may include a light to be activated when an event is detected by the sensor 60. The user interface may be relatively minimal, such as a limited-output display, or it may be a full-featured interface such as a touchscreen.

Components within the sensor 60 may transmit and receive information to and from one another via an internal bus or other mechanism. One or more components may be implemented in a single physical arrangement, such as where multiple components are implemented on a single integrated circuit. Sensors as disclosed herein may include other components, and/or may not include all of the illustrative components shown.

FIG. 7 shows an example of a home environment as disclosed herein, which may be implemented over any suitable wired and/or wireless communication networks. One or more sensors 71, 72 may communicate via a local network 70, such as a Wi-Fi or other suitable network, with each other and/or with a controller 73. The controller 73 may include, for example, the hub computing device 100 shown in FIGS. 1-2. The sensors 71, 72 shown in FIG. 9 may represent the sensor 60 shown in FIG. 6 and discussed above. Camera 75 may be one or more security cameras of the home environment. The devices of the home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 (Internet Protocol version 6) natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20a, 20b, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the home environment may include wireless system-on-chips to support the low-power, secure, stable, and/or scalable communications network 70.

The controller 73 shown in FIG. 7 that is communicatively coupled to the network 70 may be and/or include a processor. Alternatively, or in addition, the controller 73 may be a general- or special-purpose computer. The controller 73 may, for example, receive, aggregate, and/or analyze environmental information received from the sensors 71, 72 and/or camera 75. The sensors 71, 72, camera 75, and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors 71, 72 and/or camera 75 may communicate directly with a remote system 74. The remote system 74 may, for example, aggregate data from multiple locations, provide instruction, software updates, and/or aggregated data to a controller 73 and/or sensors 71, 72 and/or camera 75.

The sensor network shown in FIG. 7 may be an example of a home environment. The depicted home environment may include a structure, a house, office building, garage, mobile home, or the like. The devices of the home environment, such as the sensors 71, 72 and/or camera 75, the controller 73, and the network 70 may be integrated into a home environment that does not include an entire structure, such as an apartment, condominium, or office space.

The home environment can control and/or be coupled to devices outside of the structure. For example, one or more of the sensors 71, 72 and/or camera 75 may be located outside the structure, for example, at one or more distances from the structure (e.g., sensors 71, 72 and/or camera 75 may be disposed outside the structure, at points along a land perimeter on which the structure is located, and the like). One or more of the devices in the home environment need not physically be within the structure. For example, the controller 73 which may receive input from the sensors 71, 72 and/or camera 75 may be located outside of the structure.

The structure of the home environment may include a plurality of rooms, separated at least partly from each other via walls. The walls can include interior walls or exterior walls. Each room can further include a floor and a ceiling. Devices of the home environment, such as the sensors 71, 72 and/or camera 75, may be mounted on, integrated with and/or supported by a wall, floor, or ceiling of the structure.

The home environment including the sensor network shown in FIG. 7 may include a plurality of devices, including intelligent, multi-sensing, network-connected devices that can integrate seamlessly with each other and/or with a central server or a cloud-computing system (e.g., controller 73 and/or remote system 74) to provide home-security and home environment features. The home environment may include one or more intelligent, multi-sensing, network-connected thermostats (e.g., "network-connected thermostats"), one or more intelligent, network-connected, multi-sensing hazard detection units (e.g., "network-connected hazard detectors"), and one or more intelligent, multi-sensing, network-connected entryway interface devices (e.g., "network-connected doorbells"). The network-connected hazard detectors, network-connected thermostats, and network-connected doorbells may be the sensors 71, 72 shown in FIG. 7.

For example, a network-connected thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 7, and the controller 73 may control the HVAC system (not shown) of the structure.

As another example, a network-connected hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 7 and the controller 73 may control an alarm system to provide a visual and/or audible alarm to the user of the home environment.

As another example, a network-connected doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the home environment of the sensor network shown in FIG. 7 may include one or more intelligent, multi-sensing, network-connected wall switches (e.g., "network-connected wall switches"), one or more intelligent, multi-sensing, network-connected wall plug interfaces (e.g., "network-connected wall plugs"). The network-connected wall switches and/or network-connected wall plugs may be or include one or more of the sensors 71, 72 shown in FIG. 7. A network-connected wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the home environment. Network-connected wall switches may also control a power state or speed of a fan, such as a ceiling fan. For example, sensors 72, 72 may detect the power and/or speed of a fan, and the controller 73 may adjusting the power and/or speed of the fan, accordingly. Network-connected wall plugs may control supply of power to one or more wall plugs (e.g., such that power is not supplied to the plug if nobody is detected to be within the home environment). For example, one of the network-connected wall plugs may controls supply of power to a lamp (not shown).

In embodiments of the disclosed subject matter, a home environment may include one or more intelligent, multi-sensing, network-connected entry detectors (e.g., "network-connected entry detectors"). The illustrated network-connected entry detectors (e.g., sensors 71, 72 and/or camera 75) may be disposed at one or more windows, doors, and other entry points of the home environment for detecting when a window, door, or other entry point is opened, broken, breached, and/or compromised. The network-connected entry detectors may generate a corresponding signal to be provided to the controller 73 and/or the remote system 74 when a window or door is opened, closed, breached, and/or compromised. According to the operating mode of the security system, the system may output an alarm and/or a notification message (e.g., to a user device, such as a phone, wearable computing device, personal computer, audible message via a speaker, or the like).

The home environment of the sensor network shown in FIG. 7 can include one or more intelligent, multi-sensing, network-connected doorknobs (e.g., "network-connected doorknob"). For example, the sensors 71, 72 may be coupled to a doorknob of a door (e.g., doorknobs 122 located on external doors of the structure of the home environment). However, it should be appreciated that network-connected doorknobs can be provided on external and/or internal doors of the home environment.

The network-connected thermostats, the network-connected hazard detectors, the network-connected doorbells, the network-connected wall switches, the network-connected wall plugs, the network-connected entry detectors, the network-connected doorknobs, the keypads, and other devices of a home environment (e.g., as illustrated as sensors 71, 72 of FIG. 7 can be communicatively coupled to each other via the network 70, and to the controller 73 and/or remote system 74 to provide security, safety, and/or comfort for the home environment).

A user can interact with one or more of the network-connected devices (e.g., via the network 70). For example, a user can communicate with one or more of the network-connected devices using a computer (e.g., a desktop computer, laptop computer, tablet, or the like) or other portable electronic device (e.g., a phone, watch, wearable computing device, a tablet, radio frequency identification (RFID) tags, a key FOB, and the like). A webpage or application can be configured to receive communications from the user and control the one or more of the network-connected devices based on the communications and/or to present information about the device's operation to the user. For example, the user can view can arm or disarm the security system of the home.

One or more users can control one or more of the network-connected devices in the home environment using a network-connected computer or portable electronic device. In some examples, some or all of the users (e.g., individuals who live in the home) can register their mobile device and/or key FOBs with the home environment (e.g., with the controller 73). Such registration can be made at a central server (e.g., the controller 73 and/or the remote system 74) to authenticate the user and/or the electronic device as being associated with the home environment, and to provide permission to the user to use the electronic device to control the network-connected devices and the security system of the home environment. A user can use their registered electronic device to remotely control the network-connected devices and security system of the home environment, such as when the occupant is at work or on vacation. The user may also use their registered electronic device to control the network-connected devices when the user is located inside the home environment.

In some embodiments, the security system may change the mode of operation according to the location of the device (e.g., a phone, wearable computing device, or the like) of the registered user. For example, the system may determine, using GPS data from the user device, that the device is outside of a predetermined range from the home or building, and the system may correspondingly switch the operation mode to an away mode or vacation mode if no other occupants are in the home or building. In some embodiments, the system may transmit a message to the user's registered device (e.g., phone, wearable computing device, or the like) to notify the user of the change in operation mode. Alternatively, or in addition, the system may transmit a request to the user's device, so that the user may confirm or deny the request to change the operating mode of the security system.

Alternatively, or in addition to registering electronic devices, the home environment may make inferences about which individuals live in the home and are therefore users and which electronic devices are associated with those individuals. As such, the home environment may "learn" who is a user (e.g., an authorized user) and permit the electronic devices associated with those individuals to control the network-connected devices of the home environment (e.g., devices communicatively coupled to the network 70), in some embodiments including sensors used by or within the home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

In some embodiments, the security system and/or the home environment may learn (e.g., by aggregating data detected by the sensors over a period of time) the amount of exit time and/or exit patterns of a user. For example, the system may learn which doors of the home a user frequently exits from, what times the doors are used for exit, the patterns of movement in the house by the user prior to exit (e.g., so that the system may change the operating mode to a transition mode, before changing to an away mode when the user has left), the amount of time the user takes to exit the home, or the like. The system may learn to provide the user more time to exit the home if needed, so that an unwanted alarm is not output.

A home environment may include communication with devices outside of the home environment but within a proximate geographical range of the home. For example, the home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected devices in the home environment. For example, in the event, any of the network-connected devices, such as wall plugs located outdoors, detect movement at night time, the controller 73 and/or remote system 74 can activate the outdoor lighting system and/or other lights in the home environment.

The one or more sensors 71, 72 may be magnetic field sensors that detect a security event when a door and/or window of a building having the security system disclosed herein has been opened and/or compromised. In yet another example, the one or more sensors 71, 72 may be a smoke sensor and/or a carbon monoxide sensor that detect an environmental event when smoke is sensed and/or carbon monoxide is sensed.

More generally, the sensor 71, 72 may be any sensor capable of obtaining identifying information about a user and/or the environment in which the sensor is disposed, which can be used to determine whether the user is an authorized user by comparison to known information about the user, and to determine information about changes in the environment in which the sensor is disposed.

In embodiments of the disclosed subject matter shown in FIG. 7, the remote system 74 may be a law enforcement provider system, a home security provider system, a medical provider system, and/or a fire department provider system. When a security event and/or environmental event is detected by at least one of one sensors 71, 72 and/or camera 75, a message may be transmitted to the remote system 74. The content of the message may be according to the type of security event and/or environmental event detected by the sensors 71, 72. For example, if smoke is detected by one of the sensors 71, 72, the controller 73 may transmit a message to the remote system 74 associated with a fire department to provide assistance with a smoke and/or fire event (e.g., request fire department response to the smoke and/or fire event). Alternatively, the sensors 71, 72 may generate and transmit the message to the remote system 74. In another example, when one of the sensors 71, 72 detects a security event, such a window or door of a building being compromised, a message may be transmitted to the remote system 74 associated with local law enforcement to provide assistance with the security event (e.g., request a police department response to the security event).

The controller 73 and/or the remote system 74 may include a display to present an operational status message (e.g., a security event, an environmental event, an operational condition, or the like), according to information received from at least one or more the sensors 71, 72 and/or camera 75. For example, the display of the controller 73 and/or remote system 74 may display the operational status message to a user while the user is away from the building having the security system disclosed herein. Alternatively, or in addition, the controller 73 may display the operational status message to a user when the user arrives at and/or departs (i.e., exits) from the building. For example, one or more sensors may identify and authenticate the user, and the security system may display the operational status message.

In some configurations, as illustrated in FIG. 8, a remote system 74 may aggregate data from multiple locations, such as multiple buildings, multi-resident buildings, and individual residences within a neighborhood, multiple neighborhoods, and the like. The remote system 75 may also be a server that hosts the neighborhood network described above in connection with FIGS. 1-5. The neighborhood network may include messaging between, for example two individual neighbors, groups of neighbors, and the like. In general, multiple sensor/controller systems 81, 82 as previously described with respect to FIG. 7 may provide information and/or messages to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82. The remote system 74 may also broadcast, multicast, and/or transmit messages to the systems 81, 82 and/or controller 73.

In situations in which the systems discussed here collect personal information about users, or may make use of personal information, the users may be provided with an opportunity to control whether programs or features collect user information (e.g., a user's current location, a location of the user's house or business, or the like), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Embodiments of the presently disclosed subject matter may be implemented in and used with a variety of computing devices. FIG. 9 is an example computing device 20a, 20b suitable for implementing embodiments of the presently disclosed subject matter. The device 20a, 20b may be used to implement a controller, a device including sensors as disclosed herein, or the like. Alternatively or in addition, the device 20a, 20b may be, for example, a desktop or laptop computer, or a mobile computing device such as a phone, watch, wearable computing device, tablet, key FOB, or the like. The device 20a, 20b may include a bus 21 which interconnects major components of the device 20a, 20b, such as a central processor 24, a memory 27 such as Random Access Memory (RAM), Read Only Memory (ROM), flash RAM, or the like, a user display 22 such as a display screen and/or lights (e.g., green, yellow, and red lights, such as light emitting diodes (LEDs) to provide the operational status of the security system to the user, as discussed above), a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the device 20a, 20b are generally stored on and accessed via a computer readable storage medium.

The fixed storage 23 may be integral with the device 20a, 20b or may be separate and accessed through other interfaces. The network interface 29 may provide a direct connection to a remote server via a wired or wireless connection. The network interface 29 may provide a communications link with the network 70, sensors 71, 72, controller 73, and/or the remote system 74 as illustrated in FIG. 7. The network interface 29 may provide such connection using any suitable technique and protocol as will be readily understood by one of skill in the art, including digital cellular telephone, radio frequency (RF), Wi-Fi, Bluetooth®, Bluetooth Low Energy (BTLE), near-field communications (NFC), and the like. For example, the network interface 29 may allow the device to communicate with other computers via one or more local, wide-area, or other communication networks, as described in further detail herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments.

However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   receiving, at a computing device, a grant of temporary control access of a home security system of a first user to a second user having the computing device, wherein the temporary control access is for at least a portion of a home security system for a predetermined period of time;
   adding, at the computing device, a temporary structure to access and control the at least a portion of the home security system of the first user based on the grant of the temporary control access;
   receiving, at the computing device, a task list that includes one or more tasks to be completed by the second user for the first user while the second user has temporary control access of at least the portion of the home security system;
   receiving, at the computing device, a revocation of the temporary control access of the second user to the at least a portion of the home security system of the first user when the predetermined period of time has elapsed; and
   receiving, at the computing device, a notification of at least one selected from a group consisting of: a security event, a safety event, a home event, and a package delivery event that is determined by the home security system of the first user after the predetermined period of time has lapsed.

2. The method of claim 1, further comprising:
   determining, at the computing device, at least one selected from the group consisting of: an operational status of an alarm of the home security system, an operational status of one or more sensors of the home security system, and output from at least one sensor of the home security system when the second user has temporary control access.

3. The method of claim 1, further comprising:
   receiving, at the computing device, a notification for at least one selected from the group consisting of: a security event, a safety event, a home event, and a package delivery event that is determined by the home security system when the second user has temporary control access.

4. The method of claim 3, further comprising:
   receiving, at the computing device, at least one selected from the group consisting of: an option to receive an image or data from one or more sensors of the home security system, and an option to contact the first user when there is a safety event, a security event, a home event, or a package delivery event when the second user has temporary control access.

5. The method of claim 1, further comprising:
   receiving, at the computing device, a code or PIN to enter the home of the first user while the second user has temporary control access.

6. The method of claim 1, further comprising:
   receiving, at the computing device, a grant of at least one selected from the group consisting of: persistent guest access to the second user to a home of the first user having the home security system, and one or more new notifications from the home security system when the predetermined period of time has elapsed.

7. The method of claim 1, further comprising:
   transmitting, from the computing device, a query to one or more other devices of a neighborhood network group; and
   receiving, at the computing device, at least one from the group consisting of: recommendations from the one or more other devices based on the query, and responses from the one or more other devices based on the query.

8. The method of claim 1, further comprising:
   receiving, at the computing device from one or more other devices of a neighborhood network group, at least one selected from the group consisting of: a notification of an event, a notification of a neighborhood activity, a notification of discount opportunity, a notification of a neighborhood sale, a message from a neighbor, a notification of a query from the neighborhood network group, a neighborhood image, neighborhood video, and neighborhood audio.

9. The method of claim 8, further comprising:
   displaying, on a display of the computing device, a map showing at least one selected from the group consisting of: a location of the neighborhood activity, a location of the neighbor to share the neighborhood image, a location of the neighbor to share the neighborhood video, and a location of the neighbor to share the neighborhood audio.

10. A system comprising:
    a home security system communicatively coupled to a communications network; and
    a computing device having a processor and a memory that is communicatively coupled to the communications network that:
    receive a grant of temporary control access of a home security system of a first user to a second user having the computing device, wherein the temporary control access is for at least a portion of the home security system for a predetermined period of time;
    add a temporary structure to access and control the at least a portion of the home security system of the first user based on the grant of the temporary control access;
    receive a task list that includes one or more tasks to be completed by the second user for the first user while the second user has temporary control access of at least the portion of the home security system;
    receive a revocation of the temporary control access of the second user to the at least a portion of the home security system of the first user when the predetermined period of time has elapsed; and
    receive a notification of at least one selected from a group consisting of: a security event, a safety event, a home event, and a package delivery event that is determined by the home security system of the first user after the predetermined period of time has lapsed.

11. The system of claim 10, wherein the computing device determines at least one selected from the group consisting of: an operational status of an alarm of the home security system, an operational status of one or more sensors of the home security system, and output from at least one sensor of the home security system when the second user has temporary control access.

12. The system of claim 10, wherein the computing device receives a notification for at least one selected from the group consisting of: a security event, a safety event, a home event, and a package delivery event that is determined by the home security system when the second user has temporary control access.

13. The system of claim 12, wherein the computing device receives at least one selected from the group consisting of: an option to receive an image or data from one or more sensors of the home security system, and an option to contact the first user when there is a safety event, a security event, a home event, or a package delivery event when the second user has temporary control access.

14. The system of claim 10, wherein the computing device receives a code or PIN to enter the home of the first user while the second user has temporary control access.

15. The system of claim 10, wherein the computing device receives a grant of at least one selected from the group consisting of: persistent guest access to the second user to a home of the first user having the home security system, and one or more new notifications from the home security system when the predetermined period of time has elapsed.

16. The system of claim 10, wherein the computing device transmits a query to one or more other devices of a neighborhood network group, and receives at least one from the group consisting of: recommendations from the one or more other devices based on the query, and responses from the one or more other devices based on the query.

17. The system of claim 10, wherein the computing device receives at the computing device from one or more other devices of a neighborhood network group, at least one selected from the group consisting of: a notification of an event, a notification of a neighborhood activity, a notification of discount opportunity, a notification of a neighborhood sale, a message from a neighbor, a notification of a query from the neighborhood network group, a neighborhood image, neighborhood video, and neighborhood audio.

18. The system of claim 17, wherein the computing device further comprises a display device to display a map showing at least one selected from the group consisting of: a location of the neighborhood activity, a location of the neighbor to share the neighborhood image, a location of the neighbor to share the neighborhood video, and a location of the neighbor to share the neighborhood audio.

* * * * *